No. 740,047. Patented September 29, 1903.

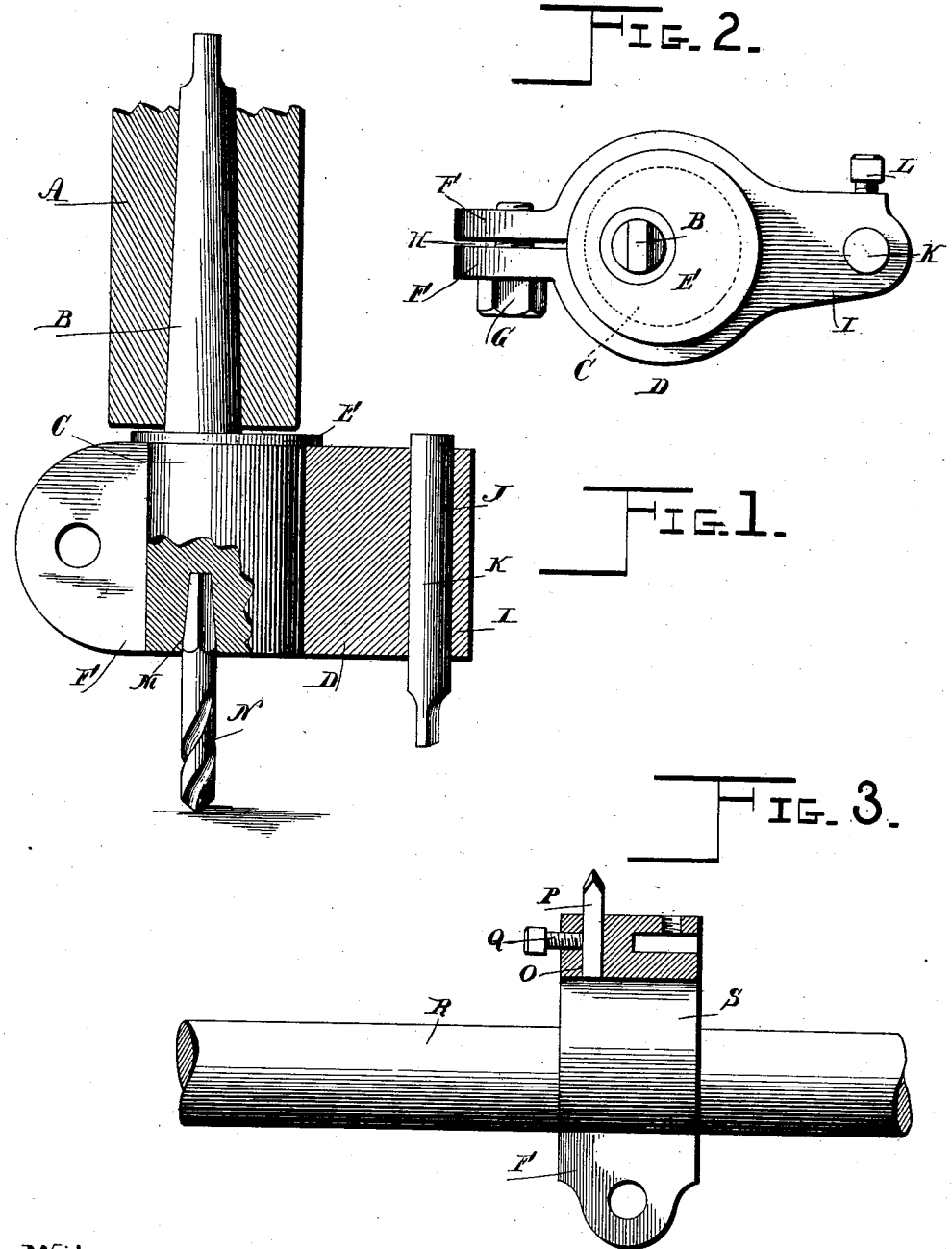

UNITED STATES PATENT OFFICE.

CARL H. SCHADE, OF CEDAR RAPIDS, AND GEORGE T. STRITE, OF TAMA, IOWA.

COUNTERBORING-TOOL.

SPECIFICATION forming part of Letters Patent No. 740,047, dated September 29, 1903.

Application filed September 15, 1902. Serial No. 123,442. (No model.)

*To all whom it may concern:*

Be it known that we, CARL H. SCHADE, residing at Cedar Rapids, in the county of Linn, and GEORGE T. STRITE, residing at Tama, in the county of Tama, State of Iowa, citizens of the United States, have invented certain new and useful Improvements in Counterboring-Tools, of which the following is a specification.

The object of this invention is to produce a boring or counterboring tool for metals adapted for quick and accurate adjustment to varying sizes of holes.

The nature of the invention will fully appear from the description and claims following, reference being had to the accompanying drawings, in which—

Figure 1 is a sectional view of a device embodying our invention. Fig. 2 is a plan view of the same as seen from the upper side. Fig. 3 is a sectional view showing the application of the same, in slightly-modified form, to a boring-bar.

The device as illustrated in Figs. 1 and 2 is designed more especially for use with a drill-press for counterboring, as in cutting washers, boring flue-holes in boiler-heads, and the like. In Fig. 3 the same principle is applied in the construction of a boring-bar for a lathe or similar machine-tool.

Referring to the drawings, A denotes the spindle of a drill-press. To this is fitted a tapered shank B, forming a part of the boring-tool. The head C of this tool is eccentric to the shank, is made cylindrical to take a tool-holding collar D, and has a flange E to prevent the tool-holder being forced upward by the pressure of the drill-spindle. The tool-holder is preferably fastened to the cylindrical head of the tool by clamping instead of by a set-screw and is therefore provided with wings F F to take a cap screw or bolt G, the wings being separated by a slot H. In a lateral extension I of the collar is a hole J, parallel with the center of the shank, to take a cylindrical shanked tool K, which is secured by a set-screw L. Concentric with the shank is a socket M to take a drill-bit N (or a mere stud) to serve as a center in boring the larger hole. In some cases it would be desirable for the tool to bore its own center hole, when the drill would be used. In other cases all the center holes might be bored elsewhere and with another tool, in which case a simple stud of the right size would of course serve the purpose.

The construction is such as to admit of very quick and nice adjustment and over a considerable range of variation in the sizes of holes desired. The shank of the tool K being cylindrical admits of proper adjustment for cutting and clearance, the tool for boiler-head work and the like being in the nature of a simple parting-tool, as shown.

It will be understood that the adjustment of the tool, radially considered, is made by loosening the clamp-bolt G, turning the collar D to the proper point, and retightening the bolt. The adjustment of the tool itself in the holder is effected by loosening the set-screw, moving the tool endwise or axially, and tightening the set-screw.

The collar may be provided with a radial hole O to take a tool P, secured by a set-screw Q. Mounted on a boring-bar R, having an eccentric S formed thereon, the device is equally convenient for general boring at a lathe. Considering the part to which the tool-holder is attached as a driver, it will be seen that the principle in both constructions is the same.

Having thus described our invention, what we claim as new, and desire to secure by Letters Patent, is—

1. A boring-tool having a cylindrical head or enlargement parallel with and eccentric to its axis, and a tool-holder adapted to turn thereon, for adjustment, and means for fastening it at any desired point.

2. In a boring-tool, the combination of a tool-holder adapted to be clamped to a cylindrical head, and a driver therefor having a shank, a centering-stud concentric therewith, and a cylindrical head to take the tool-holder eccentric to said shank.

3. A boring-tool, embracing a driver with a shank by which it is driven, a cylindrical head provided with a retaining-flange and with a socket to take a drill or stud, a stud therefor, a tool-holder adjustably mounted on said head, a tool fitted to said holder, and means for fastening the tool in the holder and the holder to the driver.

4. In combination with an eccentric driver, substantially as described, a tool-holder fitted to the eccentric of the driver and having a tool-socket formed in a lateral arm thereof, separated clamping-wings, and a clamp-screw or bolt therefor, and a set-screw or the like to hold the tool.

In testimony whereof we affix our signatures in presence of witnesses.

CARL H. SCHADE.
GEORGE T. STRITE.

Witnesses for Schade:
JOS. H. PRASTKA,
H. L. WICK.
Witnesses for Strite:
WILLIAM FORSYTHE,
F. B. PENROSE.